United States Patent

[11] 3,607,305

[72] Inventor  Herbert Willem Lincklaen Westenberg
            Vlaardingen, Netherlands
[21] Appl. No. 694,356
[22] Filed     Dec. 29, 1967
[45] Patented  Sept. 21, 1971
[73] Assignee  Lever Brothers Company
            New York, N.Y.
[32] Priority  Dec. 30, 1966
[33]         Great Britain
[31]         58379/66

[54] COOL TASTING MARGARINE
    9 Claims, No Drawings
[52] U.S. Cl. ..................................................... 99/122 R,
                                                            99/123
[51] Int. Cl. .................................................... A23d 3/02
[50] Field of Search ......................................... 99/122,
                                                            118, 123

[56]            References Cited
            UNITED STATES PATENTS
3,189,465  6/1965  Oakley et al. .................  99/122
3,240,608  3/1966  Schmidt et al. ...............  99/122
            OTHER REFERENCES
  Andersen et al., " Margarine," 2nd Revised Edition, Pergamon Press 1965, pages 36 and 50. SF268A5

Primary Examiner—Raymond N. Jones
Assistant Examiner—James R. Hoffman
Attorney—Louis F. Kline, Jr.

ABSTRACT: A liquid fat with low saturated fatty acid content is hydrogenated to a slip melting point of 30°–40°C. while substantially increasing its trans acid content and providing a dilatation curve of specified steepness and is used in blends with liquid oils for the manufacture of cool-tasting margarine with little or no added lauric acid fats. The liquid and/or hydrogenated components of the blends may be interesterified and both may be derived from the same source, e.g. sunflower, safflower or rapeseed oil.

COOL TASTING MARGARINE

This invention relates to fats and especially to the preparation of fats suitable for use in the manufacture of margarine, and to the fats so prepared and products, for instance margarine, containing them. The term "fat" is used in this specification generically to include not only the normally solid fatty acid glycerides, commonly termed "fats," but also the normally liquid fatty acid glycerides, commonly termed "oils."

Margarines are emulsions of two phases, one being fatty in nature while the other is aqueous, including for instance milk and salt, as is usual in margarine manufacture. The fatty part of the emulsion characterizes to a large extent the properties of the finished margarine, such as spreadability and consistency as well as its eating qualities. A fat blend suitable for margarine manufacture can be prepared by forming a mixture of liquid and solid or hardened fats, varying the relative amounts of these constituents when softer or harder margarines are required, which e.g. may depend on the way the margarine is to be packed. All proportions, percentages and parts referring to amounts of the constituents of compositions described in this specification are by weight.

Dilatation values, which are a measure for the amount of solids at a certain temperature in the fat blend, are normally used to characterize the melting behavior of a certain fat blend. In this specification the dilatations specified are determined by the method described in Boekenoogen "Analysis and Characterization of Oils, Fats and Fat Products," 1964, Interscience Publishers, London, pages 143–145. The fat blend in a good household margarine should have a dilatation value of about 600–200 at temperatures of usage, indicating good spreadability and shape-retaining properties at these temperatures; not too high a dilatation value at body temperature, say not more than 50, indicating that the margarine melts and disperses satisfactorily in the mouth; and not too high dilatation values at temperatures below room temperature, so that the margarine, which has been stored in a cold place and then brought out for use, is not too firm for spreading.

It is also desirable that the difference between dilatation values at 15° and 25° C. is at least 350, preferably higher than 400, which is typical for most butterfat. Some natural fats, like coconut oil and palm kernel oil, so-called fats of the lauric class, inherently possess this property, so that common use is made of this type of fat for the preparation of a butterlike margarine. However, the lauric fats possess relatively high amounts of saturated fatty acids, about 80–90 percent, and are in consequence considered less desirable in that it is thought that saturated fatty acids tend to increase the cholesterol content of the blood. Moreover, if high proportions of lauric fats are used in fat blends for margarine, say more than 50 percent, the finished margarine is either too hard and grainy at temperatures below 15° C. or too soft at temperatures above 20° C. (depending on the composition of the total blend). Furthermore, in view of the fact that the supply of laurics on the world market often fluctuates, it is advisable to look for alternative ways to prepare a household margarine of high quality with butterlike melting properties which is not unduly expensive. Though there are many raw materials available it has been found difficult up to now to prepare fat blends matching the excellent eating qualities of those containing relatively high amounts of lauric fats, without introducing at the same time undesirable features, for instance, a sandy or grainy appearance, loss of gloss or impaired spreadability.

The present invention provides a fat blend for use in margarine which has a wide spreadability range at temperatures of usage, in winter as well as in summer, and still has a good oral response, providing the sensation of cooling in the mouth and quick melting properties, without showing too high an oily exudation on storage. Such a fat blend should fulfill the following dilatation requirements:

$D_{35}$ < 50
$D_{30}$ < 150, preferably 100
$D_{25}$ 150–350
$D_{15-25}$ > 350, preferably 400
$D_{15}$ < 800 Where $D_T$ is the dilatation at T° C.

It is an advantage of the present invention that such a fat blend may be provided which contains no or only relatively low amounts of lauric fats, especially coconut oil and palm kernel oil.

It has been found that a fat blend can be prepared fulfilling the aforesaid characteristics from fat compositions comprising a liquid fat containing not more than 20 percent saturated fatty acids, for example sunflower oil, safflower oil, groundnut oil and rapeseed oil, which has been subjected to a hydrogenation treatment under isopromoting conditions to raise its transacids content substantially, or an olein fraction of such a treated fat, the hydrogenation having been so carried out that the fat has a dilatation/temperature curve, the slope of which is such that the difference between $D_{15}$ and $D_{25}+D_{30}$ is greater than 500, the slip melting point of the hydrogenated fat being in the range of 25°–30° C. All slip melting points mentioned in this application are slipping points as defined in Bailey, "Melting and Solidification of Fats," 1950, 110.

In the following table the characteristics of a number of fats hydrogenated under isopromoting conditions are assembled which show that only certain fats treated under specific conditions are suitable for the purpose of the invention. The hydrogenation was effected with a catalyst containing nickel or a nickel-containing compound in an amount of about 1 percent of nickel, based on the amount of fat, which has been rendered less active ("poisoned") by repeated use and had a sulphur content of 2 percent by weight based on nickel, at a temperature of 180° C. under atmospheric pressure. The reaction was stopped when the refraction index had dropped to a predetermined extent, which corresponded with a certain slip melting point.

| Hardened fats (numerals indicating slip melting point in °C.) | Dilatations | | | | | |
|---|---|---|---|---|---|---|
| | $D_{15}$ | $D_{20}$ | $D_{25}$ | $D_{30}$ | $D_{35}$ | $D_{15}-(D_{25}+D_{30})$ |
| Rapeseed oil: | | | | | | |
| 29 | 1,450 | 1,180 | 685 | 95 | 0 | 670 |
| 31/32 | 1,565 | 1,380 | 1,010 | 415 | 0 | 140 |
| Sunflower oil: | | | | | | |
| 29/30 | 1,145 | 885 | 480 | 10 | 0 | 655 |
| 31/32 | 1,280 | 1,055 | 665 | 200 | 5 | 415 |
| Cottonseed oil: | | | | | | |
| 29 | 675 | 470 | 265 | 100 | 0 | 310 |
| 32 | 1,130 | 915 | 620 | 325 | 25 | 185 |
| Fish oil: | | | | | | |
| 28 | 430 | 280 | 145 | 25 | 0 | 260 |
| 32 | 955 | 740 | 485 | 200 | 0 | 270 |
| Soybean oil: | | | | | | |
| 28 | 780 | 515 | 245 | 30 | 0 | 505 |
| 32 | 1,285 | 1,090 | 745 | 275 | 0 | 265 |
| Groundnut oil: | | | | | | |
| 29 | 1,255 | 910 | 510 | 80 | 0 | 665 |
| 33 | 1,435 | 1,160 | 780 | 350 | 70 | 305 |

From this table it follows that, for instance, rapeseed oil hydrogenated under isopromoting conditions until the slip melting point had reached a value of 31°–32° C, did not have the required steepness of the dilatation/temperature line. On the other hand cottonseed oil, even if hydrogenated under isopromoting conditions to slip melting points between 25° and 30° C., was not suitable at all for the purpose. It can be noticed that soybean oil hydrogenated under the specified conditions to a slip melting point of 28° C. did have the required steepness in the dilatation/temperature line, but the use of this fatty matter in margarine blends is subject to certain restrictions, on account of its inherent flavor instability. It is therefore preferred to use this oil in relatively low quantities, say about 10 percent by weight calculated on the margarine fat, or to use it always in conjunction with the other oils according to the invention.

It is believed that the favorable characteristics of the fat composition according to the invention with respect to steepness of dilatation are obtained by the formulation of transacids up to a certain level. When the hydrogenation treatment is carried past the critical point, the favorable properties are probably lost as a result of concurrent reactions, such as the formation of stearins.

The invention further provides a fat blend for use in margarine which comprises 20–80 percent of a liquid fat which initially contained not more than 20 percent of saturated fatty acids, such as sunflower oil, safflower oil, groundnut oil and rapeseed oil, and which has been subjected to a hydrogenation treatment under isopromoting conditions to raise its transacids content substantially, or an olein fraction of such an oil so treated, said hydrogenated oil or olein fraction having a slip melting point of 25°–30° C. and a $D_{15}-(D_{25}+D_{30})$ of 500 or more, as well as 0–30 percent of coconut oil or another fat of the lauric class, and 10–40 percent liquid fat, the fat blend having a dilatation at 35° C. of not more than 50, a dilatation at 30° C. of not more than 150, a dilatation at 25° C. of from 150 to 350, a difference of a dilatation between 15 and 25° C. of not less than 350 and a dilatation at 15° C. of not more than 800, the blend containing, if desired, oils and fats of kinds other than those described above in such amounts that the specified dilatation values are observed.

Preferably the total amount of hydrogenated liquid fat and lauric fat is at least 30 percent.

The amount of the hydrogenated fat which is necessary to confer the requisite dilatation characteristics on the fat blend is often comparatively low within the range specified, for example 20–40 percent, to replace lauric fats, whether partly or completely, in fat blends containing in addition other fat ingredients from different sources. Where, however, the fat phase in the margarine is to be composed on only one species of fat, in particular of rapeseed oil and a partially hydrogenated rapeseed oil or olein fraction thereof in accordance with the invention, then it may be necessary to adopt higher proportions of the hydrogenated component. In practice, however, preferably the maximum amount of the hydrogenated fat which is present in the fat blends according to the invention is approximately 70 percent, because with higher amounts the required dilatations, for example at 15° C., are difficult to achieve.

The fats selected for hydrogenation preferably afford a transacids content of 60–80 percent, most preferably 65–75 percent, in the hydrogenated fat or olein fraction.

The triglycerides present in the hydrogenated fat or its olein fraction may be in random arrangement.

The liquid fat in the blend is preferably chosen from the group of liquid vegetable oils, such as sunflower oil, safflower oil, corn oil, cottonseed oil, groundnut oil and soybean oil. Some of these fats, e.g. soybean oil, may be slightly hydrogenated while retaining their liquid character, to improve their flavor stability. If such fats are used, the amounts of liquid fat in the fat blend can be higher than 30 percent but is preferably lower than 40 percent, in general amounts of 10–30 percent being preferred. High amounts of liquid fats are preferably chosen if a blend is aimed at containing high amounts of essential fatty acids or if the blend is made from only one fat species taken from the group as specified.

If the blend is based on one fat species only, for example a mixture of hydrogenated rapeseed oil and natural, i.e. liquid rapeseed oil, or mixtures of hydrogenated and natural sunflower or safflower fats, part of the blend may be subjected to random ester interchange ("randomised") to prevent the occurrence of graininess or sandiness in the margarine on prolonged storage.

It is preferred however to effect randomization before hydrogenation where the blend is made up from a single fat species. If the steps are reversed in order, the final fat blend may have a less steep dilatation/temperature curve.

Sandiness may also occur if a relatively high amount, e.g. 50 percent of hydrogenated rapeseed oil or sunflower oil is present in the blend, in addition to other fats, but randomization of part or all of the hydrogenated rapeseed oil and sunflower oil will again prevent this undesirable phenomenon. The amounts of oil to be interesterified is chosen according to the dilatation requirements and the effect aimed at, it being generally preferred to randomize the major part of the fat present.

Of course part of the liquid fat together with all or part of the hydrogenated fat may additionally be subjected to randomization if this is desirable to give the dilatation/temperature line the desired curve.

If the blend contains coconut oil or palmkernel oil up to the amounts described above the randomization may be effected without any objection after the hydrogenation, but in that case lauric fats present should be randomized as well.

A suitable range of proportions for randomization is 40–60 to 60–40 of hydrogenated fat and lauric fat present. For example, a 50/50 mixture of rapeseed oil hardened to a slip melting point of 27° C. and coconut oil gives a fat, after randomization, with a $D_{15}-(D_{25}+D_{30})$ of 710 and may therefore be used with liquid fats in blends according to the invention.

Rapeseed oil is particularly useful as an ingredient for the fat blends according to the invention, hydrogenated under isopromoting conditions to a slip melting point between 25°–30C., especially of about 29°C. and an iodine value of 85 to 90. This fat composition shows besides the desired steepness in its dilatation curve other favorable properties like suitable dilatation values in general, which make it easy to compose a fat blend with general excellent dilatation characteristics as well as a moderate rate of crystallization, so that processing of the blend, even with relatively high amounts of this oil, does not lead to excessive pressures in the cooling unit, causing overworking of the margarine or even blocking of the unit.

If sunflower oil or safflower oil is used, this is preferably hydrogenated under isopromoting conditions to a slip melting point of 26°–30°C. and an iodine value of 83–90.

If groundnut oil is used according to the invention, it is preferably hydrogenated under isopromoting conditions to a slip melting point of 28°–29°C.

Olein fractions can also be used in the fat blends according to the invention, obtained from suitable fats hydrogenated under isopromoting conditions to a slip melting point in the range of 30°–40° C. Probably the total transacid content of fats hydrogenated to higher slip melting points than 30° C. is lower but by suitable fractionation to afford an olein fraction having a slip melting point of 25–30° C. the transacid content in the olein fraction is enriched and comes into the desired range. For example sunflower oil hydrogenated under isopromoting conditions to a slip melting point of 34° C., yielded an olein fraction having a slip melting point of 25° C. and a $D_{15}-(D_{25}+D_{30})$ of 795. An olein fraction of safflower oil prepared under similar conditions had a $D_{15}-(D_{25}+D_{30})$ of 820.

The fractionation of the fats to obtain olein fractions may be carried out according to methods known in the art. A suitable method is one in which the fat is liquefied by heating to about 60° C., gradually cooled to 25°–30° C. for several hours and kept at this temperature for a time sufficiently long to establish equilibrium. The cooling is preferably carried out under gentle stirring. After the crystallization period the stearins are filtered off in the usual way.

The fractionation is often carried out in two or more steps by which the crystals formed are successively removed in order to minimize filtration losses and to obtain a high yield of oleins.

Fractionation can also be effected by other methods for example crystallization of the fat, after it has been liquefied, in the presence of organic solvents, followed by separation of the crystals or treating an oil/crystal mixture with an aqueous solution containing wetting agents followed by centrifuging.

In general, olein fractions suitable for use in the compositions of the invention can be obtained in a yield of about 50–60 percent by weight. Olein fractions obtained in lower yields, say of about 30–40 percent also suitable, but of course the highest possible yields are attempted consistent with having a slip melting point in the range of 25°–30° C.

The selected hydrogenated fats can be used in mixtures, if desired, because they have no interaction unfavorable for the properties of the final blend.

The general conditions for the hydrogenating treatment are chosen to favor the formation of transacids and the temperature is preferably therefore relatively high, viz, in the range of 150° to 225° C., preferably 170° to 200° C., whereas only moderate pressure is chosen, i.e. not more than approximately 20 atmosphere, atmospheric pressure being preferred.

The catalytic material normally used in the process of the invention is nickel in amounts of 0.1–1 percent by weight of the fat, and is used in the conventional forms, for example impregnated or precipitated on a carrier. Preferably the catalyst contains 0.1 to 10 percent, preferably 1–3 percent of sulfur. This can be incorporated in the catalyst in various ways, for example by adding sulphur flour to a nonreduced catalyst followed by reducing the catalyst or blowing hydrogen sulphide gas over a reduced catalyst. Various other ways are possible, the manner in which sulphur is incorporated in the catalyst not being critical.

A suitable catalyst is one which has been repeatedly used for hydrogenating sulphur-containing oils, like whale oil. Such a catalyst is poisoned by the sulfur in the treated oil and contains after repeated use about 1–2 percent of sulphur calculated on nickel. For the conversion of unsaturated bonds into saturated bonds such a catalyst has lost most of its activity, but is very suitable for use according to the invention in providing fats with high amounts of transacids.

A typical blend according to the invention is for instance 50 percent rapeseed oil hardened —as indicated above —to a slip melting point of 29° C., having a transacids content of 72 percent,
20 percent liquid oil, like sunflower oil,
20 percent coconut oil,
10 percent palmoil, hydrogenated to a slip melting point of b 45° C.

The dilatation values of this blend are as follows:
$D_{15}=645$
$D_{20}=415$
$D_{25}=205$
$D_{30}=35$
$D_{35}=0$
$D_{15}-D_{25}=440$ If a margarine fat is desired containing substantial amounts of linoleic acid, without affecting its overall properties (i.e. not reducing its packability in wrappers or leading to oil exudation), the blend may for instance be composed of 25 percent sunflower oil
10 percent slightly hardened soybean oil
10 percent groundnut oil hydrogenated to slip melting point 35° C.
20 percent sunflower oil hydrogenated to slip melting point 34° C.
5 percent palmoil hydrogenated to slip melting point 45° C.
30 percent rapeseed oil hydrogenated to slip melting point 29° C. (according to the invention The groundnut oil and sunflower oil were hydrogenated under isomerizing conditions using an inactivated nickel catalyst until the desired melting point was obtained. The palmoil was hydrogenated with a fresh nickel catalyst to the desired melting point.

The amount of linoleic acid is then about 15–20 percent.
The dilatation values were as follows:
$D_{15}=740$
$D_{20}=545$
$D_{25}=315$
$D_{30}=105$
$D_{35}=5$
$D_{15}-D_{25}=425$ A typical summer blend, able to withstand the higher storage temperature in summer and not showing any oily exudation or impaired shape-retaining properties is for instance composed of:

23 percent sunflower oil
15 percent slightly hardened soybean oil
10 percent groundnut oil hydrogenated to slip melting point of 35° C.
15 percent fish oil hydrogenated to slip melting point of 37° C.
7 percent palmoil hydrogenated to slip melting point of 45° C.
30 percent rapeseed oil with a slip melting point of 29° C. according to the invention.

The dilatation values were as follows:
$D_{15}=735$
$D_{20}=560$
$D_{25}=350$
$D_{30}=125$
$D_{35}=0$
$D_{15}-D_{25}=370$ As can be gathered from the foregoing examples, other fats may be present in the composition to give the margarine the desired firmness, provided that the specified dilatation values are observed, for example, hydrogenated fats with a slip melting point of 30–40° C. in amounts up to 50 percent, e.g. groundnut oil or cottonseed oil hydrogenated to a slip melting point of 35° C., hydrogenated fats with slip melting points between 40 and 45° C. or stearins with a slip melting point in this range in amounts up to 15 percent, as well as consistent fats, e.g. palmoil, lard, tallow, in amounts of up to 20 percent, provided they do not adversely affect the taste of the margarine. In a particular blend the amounts of these fats must be chosen in accordance with the type of margarine aimed at and in accordance with the dilatation requirements specified. In the above case the hydrogenation can be effected in various ways, e.g. with a fresh catalyst as well as with an inactivated catalyst, such as nickel, provided the desired melting points are observed. These fats are included in the fat blend in such a way that the dilatation requirements are observed, so that e.g. the amount of liquid oil is not so high that the $D_{25}$ will become lower than 150 or the amount of higher melting fats so high that the $D_{15}$ will be greater than about 800.

Blends and compositions according to the invention can be processed without any difficulty with the conventional equipment for the manufacture of margarine. Such equipment comprises, for instance, a closed tubular surface-scraped heat exchanger, in which the margarine blend is chilled and worked and thereafter given the opportunity to crystallize completely before being printed. The rate of crystallization of the fat blend is not so high as to make manufacturing difficult. If desired, the final product may be liquid-filled in tins.

The following Examples illustrate the invention.

EXAMPLE 1

Rapeseed oil with a refraction $N^{65}_D$ of 1.4561 was hydrogenated, using 1 percent of a nickel catalyst which was inactive by repeated previous use and had a sulphur content of 2 percent sulphur calculated on nickel at a temperature of 180° C. at atmospheric pressure. The reaction was stopped when the oil had a slip melting point of 29° C. and a $N^{65}_D$ of 1.4533 and the iodine value had dropped to 80.9. The dilatation at 30° C. was 95 and the difference between $D_{15}$ and $(D_{25}+D_0)$ was 670.

A composition was made containing 50 percent of this hydrogenated rapeseed oil, 20 percent coconut oil, 20 percent sunflower oil and 10 percent palmoil hardened to a slip melting point of 45° C. The composition was liquefied at a temperature of 40° C. and emulsified in a ratio 85:15 with an aqueous phase made of sour milk. 0.1 percent monodiglycerides were added as emulsifiers. The emulsion was crystallized and worked in a "Votator" A-unit, a closed tubular surface-scraped heat exchanger, which it left at a temperature of 15° C.

The throughput was 3 kg./h, the residence time of the emulsion in the scraped cooler about 20 sec. Thereafter the crystallized emulsion was moved through an empty resting tube comprising the B-unit of the "Votator," where it crystallized further for 160 sec. and was taken printed.

The finished margarine had the following dilatation values:
$D_{15}=630$
$D_{20}=440$
$D_{25}=235$
$D_{30}=75$ $D_{35}=15$ $D_{15}-D_{25}=395$ It gave a cooling sensation in the mouth and showed no oily exudation on storage.

EXAMPLE 2

30 percent of rapeseed oil, hardened as described in Example 1, but to a slip melting point of 27° C. and a transacids content of 69 percent was blended with 20 percent slightly hardened soybean oil as the liquid fat, 15 percent palmoil and 35 percent hardened fish oil (slip melting point 33° C.). The blend was incorporated into a margarine as before. The margarine made had the following dilatation values:

$D_{15}=795$
$D_{20}=575$
$D_{25}=315$
$D_{30}=80$
$D_{35}=0$
$D_{15}-D_{25}=480$

The margarine was of excellent quality and was cool and thin melting in the mouth.

EXAMPLE 3

Rapeseed oil hardened as described in Example 2 was interesterified with an equal amount of coconut oil, sodium methylate being the catalyst. The interesterified mixture was mixed in the proportion of 50 percent with 20 percent sunflower oil and 30 groundnut oil hardened to a slip melting point of 35° C. The resulting fat blend was incorporated into margarine as previously described. The margarine had the following dilatation values:

$D_{15}=735$
$D_{20}=460$
$D_{25}=190$
$D_{30}=25$
$D_{35}=0$
$D_{15}-D_{25}=545$

The margarine was cool and thin melting in the mouth.

EXAMPLE 4

40 percent rapeseed oil with a slip melting point of 29° C. and a transacids content of 72 percent, prepared according to Example 1, was mixed with 20 percent sunflower oil, 5 percent palmoil hardened to a slip melting point of 45° C., 20 percent palmoil and 15 percent groundnut oil hardened to a slip melting point of 35° C. The blend was made up into margarine as before. The margarine was satisfactory to the taste and had the following dilatations:

$D_{15}=760$
$D_{20}=595$
$D_{25}=330$
$D_{30}=105$
$D_{35}=0$
$D_{15}-D_{25}=430$

EXAMPLE 5

A fat blend was made of the following ingredients:
25 percent groundnut oil
30 percent hydrogenated sunflower oil
10 percent coconut oil
30 percent cottonseed oil hydrogenated to slip melting point 35° C.
5 percent palmoil A margarine prepared from the blend in the manner previously described was very cool and thin melting in the mouth and had the following dilatations:

$D_{15}=630$
$D_{20}=450$
$D_{25}=265$
$D_{30}=70$
$D_{35}=0$
$D_{15}-D_{25}=365$

The sunflower oil was hydrogenated under isopromoting conditions with 1 percent of a spent nickel catalyst at 180° C. and atmospheric pressure until the refraction $N^{65}_D$ dropped to 1.4541. The lip melting point was then 26° C., the iodine value 90.7 and the transacids content was 70 percent.

EXAMPLE 6

Sunflower oil hydrogenated as described in Example 5 was worked into another blend, not containing lauric fat. This composition was as follows:
10 percent liquid, slightly hardened soybean oil
30 percent whale oil hardened to slip melting point 35° C.
25 percent palmoil
15 palmoil hydrogenated to a slip melting point 45° C.
30 percent sunflower oil composition according to the invention.

The dilatations were as follows:

$D_{15}=720$
$D_{20}=550$
$D_{25}=325$
$D_{30}=140$
$D_{35}=15$
$D_{15}-D_{25}=395$

Margarine prepared from the blend in the manner described was also very cool and thin melting in the mouth.

EXAMPLE 7

A blend was made of rapeseed oil only, viz:
70 percent hydrogenated rapeseed oil with a slip melting point of 29° C.
30 percent rapeseed oil.

The dilatations were as follows:

$D_{15}=755$
$D_{20}=530$
$D_{25}=230$
$D_{30}=90$
$D_{35}=0$
$D_{15}-D_{25}=525$

Margarine prepared from this blend as before was very cool and thin melting in the mouth.

A blend was made from sunflower oil only, comprising: 75 percent hydrogenated sunflower oil with a slip melting point of 29° C., a transacid content 72 percent and a dilatation/temperature curve in accordance with the invention,
25 percent sunflower oil.

The dilatation values of the blend were as follows:

$D_{15}=780$
$D_{20}=560$
$D_{25}=300$
$D_{30}=10$
$D_{35}=0$
$D_{15}-_{25}=480$

A margarine prepared as before from this blend was very cool and thin melting in the mouth.

EXAMPLE 9

A fat blend was made with a rapeseed oil composition according to the invention and coconut oil, as follows:
10 percent sunflower oil
30 percent coconut oil
50 percent rapeseed oil of a slip melting point of 29° C. according to the invention
5 percent rapeseed oil hydrogenated to a slip melting point of 45° C.
5 percent palmoil hydrogenated to a slip melting point of 45° C.

The dilatations were as follows:

$D_{15}=800$
$D_{20}=450$
$D_{25}=230$
$D_{30}=75$
$D_{35}=0$
$D_{15}-D_{25}=570$

The blend produced a satisfactory margarine.

EXAMPLE 10

Sunflower oil was hydrogenated using the same catalyst, temperature and pressure as in Example 1 but to a slip melting point of 34° C.

The fat was then heated to 60° C. and gradually cooled in a 3 h to a temperature of 30° C., under gentle stirring. After equilibrium was reached the crystals formed were filtered off. The cooling was then continued to a temperature of 25° C. and after equilibrium was reached again the crystal were filtered off. The olein, which had a slip melting point of 26° C. was obtained in a yield of about 40 percent and its $D_{15}-(D_{25}-D_{30})$ was 795. Its transacids content was 68 percent. A fat blend was made containing 20 percent groundnut oil, 10 percent coconut oil, 30 percent groundnut oil hardened to a slip melting point of 35° C. and 40 percent of the sunflower olein. The dilatations were as follows:

$D_{15}=770$
$D_{20}=555$
$D_{25}=270$
$D_{30}=50$
$D_{35}=0$
$D_{15}-D_{25}=500$

Margarine prepared from the blend was cool and thin melting in the mouth.

We claim:

1. A margarine essentially consisting of about 80 percent by weight of a fat blend and about 20 percent by weight of an aqueous phase dispersed in said fat blend, said fat blend having dilatation values at 35° C. of less than 50, at 30° C. of less than 150, at 25° C. of 150 to 350, a difference in dilatation values at 15° C. and 25° C. of not less than 350 and at 15° C. of less than 800, and consisting essentially of:
   a. 20 percent to 80 percent of a partially hydrogenated liquid fat containing not more than 20 percent of saturated fatty acids, the hydrogenated fat having a slip melting point of 25° to 30° C., a transacid content of 60 percent to 80 percent and a difference in the dilatation values at 15° C. and the sum of the dilatation values at 25° and 30° of greater than 500;
   b. 0 percent to 30 percent of a fat of the lauric acid class; and
   c. 10 percent to 40 percent of a liquid fat.

2. A margarine according to claim 1, the fat blend of which consists of the partially hydrogenated fat and the fat of the lauric acid class together in an amount of at least 30 percent by weight of the fat blend, the partially hydrogenated fat comprising 20 percent to 70 percent of the blend.

3. A margarine according to claim 1, all the fat components of its fat blend being derived from a single fat species.

4. A margarine according to claim 1, wherein the partially hydrogenated fat is a partially hydrogenated rapeseed or sunflower fat, part at least of the glyceride content of which is present in random arrangement.

5. A margarine according to claim 1, which contains a randomized blend of part or all of the partially hydrogenated fat and part of the liquid fat.

6. A margarine according to claim 1, which contains a randomized blend of the fat of the lauric acid class and the partially hydrogenated fat.

7. A margarine according to claim 6, in which the proportions of the partially hydrogenated fat and lauric fat in the randomized blend are from 40:60 to 60:40.

8. A margarine according to claim 1, wherein the partially hydrogenated fat is selected from the group consisting of partially hydrogenated sunflower, safflower, corn, cottonseed, groundnut, rapeseed and soybean fat.

9. A margarine according to claim 8, in which the partially hydrogenated fat is a rapeseed fat with a slip melting point between 25° and 30° C., having an iodine value of 85 to 90.

20946

PO-1050
(5/69)

UNITED STATES PATENT OFFICE
CERTIFICATE OF CORRECTION

Patent No. 3,607,305            Dated  September 21, 1971

Inventor(X) Herbert Willem Lincklaen Westenberg

It is certified that error appears in the above-identified patent and that said Letters Patent are hereby corrected as shown below:

Column 3, line 26, "composed on" should read --composed of--;

Column 3, line 66, --or higher-- should appear after "percent";

Column 4, line 17, "30C" should read --30°C--;

Column 4, line 68, --are-- should appear after "percent";

Column 5, lines 9 and 18, change "sulfur" to --sulphur--;

Column 5, line 31, "b 45°C" should read --45°C--;

Column 6, lines 47 and 52, "$N^{65}D$" should read --$N_D^{65}$--;

Column 6, line 55, "$(D_{25}+D_0)$" should read --$(D_{25} + D_{30})$--;

Column 6, line 70, "taken" should read --then--;

Column 7, line 29, --percent-- should appear after "30";

Column 8, line 3, "$N^{65}D$" should read --$N_D^{65}$--;

Column 8, line 4, "lip" should read --slip--;

Following line 41 of Column 8, the heading --EXAMPLE 8-- should appear;

Column 8, beginning at line 42, indent as a new paragraph the phrase after "comprising" which reads "75 ...";

Column 9, line 7, "a" should be deleted.

Signed and sealed this 4th day of April 1972.

(SEAL)
Attest:

EDWARD M.FLETCHER,JR.                ROBERT GOTTSCHALK
Attesting Officer                    Commissioner of Patents